Reissued Nov. 18, 1952 Re. 23,584

UNITED STATES PATENT OFFICE 23,584

MANUFACTURE OF PENTAERYTHRITOL

Harry Jackson, Stevenston, and Griffith Glyn Jones, Annan, Scotland, assignors to Imperial Chemical Industries Limited, a corporation of Great Britain No Drawing. Original No. 2,562,102, dated July 24, 1951, Serial No. 695,050, September 5, 1946. Application for reissue December 3, 1951, Serial No. 259,698. In Great Britain September 17, 1945

2 Claims. (Cl. 260—635)

Matter enclosed in heavy brackets [ ] appears in the original patent but forms no part of this reissue specification; matter printed in italics indicates the additions made by reissue.

The present invention is concerned with a new and improved process for the manufacture of pentaerythritol by means of the well known reaction that occurs between acetaldehyde and formaldehyde in aqueous solution in presence of a strong base such as calcium hydroxide.

In the earlier preparations of pentaerythritol described in the literature the two aldehydes were caused to react in presence of the base at very high dilutions over long periods of time, so that they were not well adapted for commercial production. In the processes that have been employed commercially for the production of pentaerythritol, the aldehydes are used in considerably higher concentrations, the acetaldehyde concentration usually exceeding one mole for every 80 moles water, and the temperatures are such that the alkaline condensation is completed in the course of an hour or two or even less. The alkali most commonly used is lime; and after the alkaline condensation is over a precipitant for the calcium formate and other soluble calcium compounds present in the resulting solution is introduced, and the clear liquor is evaporated down under reduced pressure until crude pentaerythritol can be crystallised from it. The precipitation of the calcium compounds is commonly carried out by acidifying the solution with sulphuric acid in amount sufficient to convert them into calcium sulphate, most of which settles out, the clear liquor being further treated for the conversion of the calcium sulphate remaining in the solution into insoluble compounds or partly into insoluble compounds and partly into soluble compounds that will not deposit during the evaporation.

It is well known that troublesome by-products are formed in the reaction mixture. These troublesome by-products include syrupy products resulting from self-condensation of formaldehyde in presence of the base, and also dipentaerythritol. It has also been stated that tripentaerythritol which, like dipentaerythritol, is a polyhydroxy compound but contains two ether groups instead of one, is formed. Both the syrupy self-condensation products of formaldehyde and the poly-pentaerythritols interfere with the recovery of the pentaerythritol. The syrupy products, however, are easily soluble in alcohol and can be removed from the crude pentaerythritol much more easily than can the crystalline poly-pentaerythritols, from which it is especially difficult to separate the pure pentaerythritol, even by recrystallisation.

It should theoretically be possible to achieve the complete conversion of the reagents in the alkaline reaction mixture into pentaerythritol and calcium formate if there are present 4 moles formaldehyde and 0.5 mole calcium hydroxide per mole acetaldehyde. When the theoretical quantities of the reagents are present, the fact that the formaldehyde and the lime are partly consumed in the formation of the aforesaid by-products implies that there will be insufficient to react with the whole of the acetaldehyde to form pentaerythritol. With the object of minimising the loss occasioned by formation of these by-products, it is usual to employ somewhat more than the theoretical proportions of formaldehyde and lime, for instance 4.5 moles formaldehyde per mole acetaldehyde, and at least sufficient calcium hydroxide to leave some undissolved lime after the reaction is over.

When a reaction mixture, in which acetaldehyde is gradually added to a mixture of lime and formaldehyde solution in excess as aforesaid, has been allowed to warm up during the early stages of the reaction and is maintained at a suitable temperature during the addition of the acetaldehyde, there is a tendency for a further rise in the temperature to take place spontaneously after the acetaldehyde has all been added. It has hitherto been the practice, in order to ensure the completion of the desired reaction after the ingredients of the reaction mixture have all been introduced to permit the temperature to rise to a point just short of the point at which a dark yellow or brown colour develops, and to keep the reaction mixture stirred until the falling aldehyde concentration of the solution shows no further tendency to diminish. This temperature may be anything from about 45° C. to 63° C. according to the manner in which the reaction is carried out. Figures have been published by Friedrich and Braun (Berichte 1930, LXIII, page 2687) indicating that when one half mole of lime is used per mole acetaldehyde and the reaction mixture is heated at the end to 45° C., the ratio of pentaerythritol to other compounds in the crude pentaerythritol is at a maximum when five moles formaldehyde are used per mole acetaldehyde.

It is an object of the present invention to improve the ratio of the amount of pentaerythritol to the amount of other products formed in the reaction, and especially to improve the ratio of pentaerythritol to poly-pentaerythritols in the crude crystallised pentaerythritol so that pentaerythritol of improved purity may be obtained. A further object is to provide a process suitable for commercial application wherein an improved yield of pentaerythritol of high quality is obtained.

The present invention is based in part on the observation that, when the condensation is carried out in presence of an excess over the theoretical amount of the alkaline material sufficient to leave an excess on the disappearance of the acetaldehyde, the employment of increasingly large excesses of formaldehyde over the theoretical quantity reckoned on the acetaldehyde, ranging from about 5 to 10 or even more moles per mole acetaldehyde results in a progressive reduction in the amount of the dipentaerythritol or other by-products formed in the reaction that crystallises from the concentrated liquors with the pentaerythritol and that in part on the observation that if the customary heating at the end of the reaction is omitted and the temperature of the alkaline reaction mixture is never allowed to exceed 33° C., and the reaction is interrupted whenever the acetaldehyde has been consumed, any such amounts of formaldehyde may be employed without giving rise to any extensive formation of syrupy formaldehyde alkaline condensation products and can be easily removed and largely recovered so that pentaerythritol of high quality may be obtained in improved yield.

According to the present invention, a process for the manufacture of pentaerythritol by the interaction of formaldehyde and acetaldehyde in the presence of a strongly basic hydroxide comprises the employment of a considerable excess of formaldehyde over the theoretical reckoned on the acetaldehyde and a quantity of said hydroxide exceeding the theoretical amount sufficient to leave an excess on the disappearance of the acetaldehyde, maintaining the alkaline reaction mixture at a temperature not exceeding 33° until the disappearance of the acetaldehyde and thereupon, still at a temperature not exceeding 33° C., removing its free alkalinity.

After the free alkalinity of the reaction mixture has been removed by adding sufficient of an acid to render the solution only slightly acid to an indicator changing colour at about the same acidity as Methyl Red the unreacted excess of formaldehyde may be stripped from the reaction mixture, preferably by steam distillation at ordinary or increased pressure. Temperatures in the region of 100° C. are incapable of converting the formaldehyde present in the no longer alkaline medium into syrupy by-products. High temperatures are indeed beneficial at this stage since they tend to decompose powdery or crystalline polymers of formaldehyde which might otherwise tend to contaminate the subsequently crystallised crude pentaerythritol and render any further purification thereof more difficult. In order to facilitate the recovery of the formaldehyde in the distillate obtained, it is preferred that when removing the free alkalinity of the liquor containing the pentaerythritol and the formate of the base formed in the reaction, the amount of acid used should be insufficient to liberate any substantial proportion of the formic acid present in the said formate, as will be the case if the mixture is made only slightly acid to Methyl Red. The distillate will thus be practically free from formic acid. The pentaerythritol may then be recovered from the stripped liquor substantially in known manner, for instance in the case where calcium hydroxide has been used as the strongly basic hydroxide, as is preferable, by addition of sufficient sulphuric acid to liberate the formic acid from the calcium formate in the solution filtration from calcium sulphate, treatment with witherite so as to convert calcium sulphate remaining in solution into barium sulphate and calcium formate, further filtration and evaporation under reduced pressure.

In putting the invention into effect, the amount of formaldehyde employed in the reaction mixture per mole acetaldehyde may range from 5 to about 10 moles, or even more, and is preferably at least 7 moles. The amount of the lime should preferably be sufficient to leave an undissolved excess at the end of the reaction. Preferably the formaldehyde solution and the calcium hydroxide are mixed together and the acetaldehyde, desirably in aqueous solution, is gradually added to the mixture with agitation. Except that during the admixture of the reagents and during the subsequent period while the mixture is kept agitated until the acetaldehyde is consumed the temperature must be rigorously controlled so that it never exceeds 33° C. and apart from the preferably high proportion of formaldehyde used the conduct of the condensation reaction according to the present invention need present no special feature. An incidental advantage of the lower maximum temperatures to which the reaction mixture is subjected lies in the fact that they tend to minimise the losses occasioned by volatilisation of the acetaldehyde, and this can only be advantageous to the yield of pentaerythritol obtained. If desired the cooled alkaline reaction mixture may be filtered or decanted away from the undissolved portion of the excess of lime before the liquor is treated with acid used to convert the free lime present in it or calcium salt, for instance sulphuric acid, sufficient of the acid being employed to confer a faint permanent formic acid acidity on the liquor. Methyl Red may be used at this stage to indicate by a change in colour from yellow to red when sufficient acid has been added. When sulphuric acid is used the precipitated calcium sulphate is preferably removed, for instance by filtration. Acids yielding easily soluble calcium salts may however be used instead of sulphuric acid, for instance formic acid, and in this case the whole of the free line dissolves up and filtration is rendered unnecessary at this stage. Pentaerythritol mother liquors rich in formic acid may be used for this purpose.

The formaldehyde is next stripped from the liquid by distillation, preferably in a current of steam, and is recovered in the aqueous distillate. The distillation is preferably carried out at ordinary atmospheric pressure or even at an increased pressure, since under the prevailing non-alkaline conditions high temperatures no longer can result in the formation of syrupy products from the formaldehyde. It is frequently convenient to conduct the distillation so as to effect a diminution in the volume of the liquor being distilled. The formaldehyde-containing aqueous distillate obtained is practically free from formic acid and can be used, after concentration by fractional distillation, if necessary, in a subsequent preparation. It is accordingly economical to employ quite substantial excesses of formaldehyde over the theoretical in the reaction mixture, for instance from 7 to 10 moles per mole acetaldehyde and thereby obtain the benefits in yield and freedom from di-pentaerythritol that accrue from the use of high molar ratios of formaldehyde to acetaldehyde.

The stripped liquor containing the pentaerythritol and calcium formate in solution may next be treated with sufficient sulphuric acid to liberate the formic acid from the calcium formate and the resulting mixture may be worked up substantially in known manner, the production of the pentaerythritol in the final stages being facilitated by the relative freedom of the final concentrate from syrupy products and, more particularly when a large excess of formaldehyde over the theoretical amount has been used, its reduced di-pentaerythritol content.

The invention is further illustrated in the following examples:

Example I

This example illustrates the advantage in respect of high quality product of the process according to the invention over a process in which the alkaline liquor is finally heated, the formaldehyde present in the reaction mixture at the start in each case amounting to 5.8 moles per mole aldehyde.

12.5 lbs. acetaldehyde (in the form of 29.6 lbs. of 42.33% aqueous solution) (1 mole).

49.4 lbs. formaldehyde (in the form of 135.8 lbs. of 36.4% formalin) (5.8 moles).

16.8 lbs. hydrated lime (0.8 mole).

250 lbs. water.

The hydrated lime and the water were stirred to form a slurry and the addition of formaldehyde was commenced at 25° C. Five minutes later the addition of the acetaldehyde solution was started. The whole of the formaldehyde was added at a constant rate to the stirred slurry over 20 minutes, and the rate of addition of the acetaldehyde solution was regulated so that the reaction mixture remained at or below 30° C. with the cooling water circulating around the reaction vessel. Under these conditions about 45 minutes was required for the addition of the acetaldehyde. The mixture was stirred for a further 60 minutes with the water in the jacket stationary. The temperature falling to 28° C. by this time the liquor was free from the odour of acetaldehyde. It was then cooled to 20° C. 16.8 lbs. of 50% sulphuric acid (0.3 mole) were then added, this amount sufficing to render the liquor acid to Methyl Red. The liquor was allowed to settle and the calcium sulphate deposited was filtered off and washed, the filtrate and washings being bulked in a calibrated vessel for measurement. An aliquot portion of the liquor was passed down a packed distillation column in counter-current to a current of steam at atmospheric pressure until the formaldehyde concentration in the stripped liquor had fallen to 0.1% free formaldehyde. The calcium formate in the stripped liquor was then converted into calcium sulphate by the addition of the calculated quantity of sulphuric acid (0.5 mole per mole acetaldehyde) and the liquid was allowed to settle. It was then filtered, treated with sufficient witherite to convert the remaining soluble sulphate in the liquor into barium sulphate and again filtered. The filtered liquor was treated with a small amount of ammonia sufficient to convert any residual formaldehyde into hexamethylene tetramine, and the solution was evaporated down under reduced pressure until the pentaerythritol began to crystallise. The solution was cooled and the crystal crops were bulked and analysed by a nitration method in order to determine their pure pentaerythritol content, which was 75.6% of the theoretical calculated on the amount of acetaldehyde employed. The crude pentaerythritol had a pure pentaerythritol content of approximately 90% and a dipentaerythritol content of about 3–4% as estimated by nitration. The uncrystallisable residue amounted to only about 15 grams per litre of the decalcified liquor.

Another aliquot portion of the solution acidified to redness with Methyl Red but still containing calcium formate, was rendered alkaline by the addition of the amount of hydrated lime equivalent to the amount of sulphuric acid that had been used, namely 0.3 mole per mole acetaldehyde, and was warmed with stirring to 50° C. On being kept at 50° C. for some time its temperature commenced to rise without external heating. The rise in temperature was checked so that it did not amount to more than a few degrees.

The liquor was then treated with sufficient sulphuric acid to convert the whole of the calcium formate into calcium sulphate, and was settled and filtered and treated with witherite and again filtered. The clear filtrate was then evaporated under reduced pressure as before until crystallisation commenced. Two crops of crystals were obtained, further evaporation yielding a syrupy residue which did not crystallise and which on careful evaporation to dryness weighed 38 grams per litre of decalcified solution. This residue was of dark amber colour and treacly consistency, and had a strong odour of caramel. The quality of the crude pentaerythritol obtained was substantially the same as that of the crude product obtained according to the method of our invention but the yield of pure pentaerythritol estimated by the nitration method was only 67.5% calculated on the acetaldehyde.

Example II

The condensation was carried out as described in Example I up to the stage of the first addition of sulphuric acid, except that the amount of formaldehyde used was 192 lbs. of a 35.6% formalin solution, corresponding to a molar formaldehyde acetaldehyde ratio of 8 to 1. The whole of the product was then worked up as described for the first aliquot portion of the solution in Example I. The yield of pure pentaerythritol by the nitration method in the crude pentaerythritol amounted to 82% of the theoretical based on the acetaldehyde used, the crude pentaerythritol (in three crops) containing about 94–96% pentaerythritol and about 0.1% dipentaerythritol. The first crop amounted to about ¾ of the whole melted at 253–254° C. and was 98–99% pure pentaerythritol.

We claim:

1. In the process for the production of pentaerythritol by the interaction of formaldehyde and acetaldehyde in the presence of a strongly basic metallic hydroxide, the increasing of the ratio of pentaerythritol to poly-pentaerythritol in the reaction mass which comprises employing between five and ten moles formaldehyde and in excess of one-half mole of said hydroxide per mole of acetaldehyde in the reaction mixture, maintaining the alkaline reaction mixture at a temperature not exceeding 33° C. until the disappearance of the acetaldehyde and thereupon, still at a temperature not exceeding 33° C., removing the free alkalinity of the reaction mixture by addition of sufficient acid to impart an acidity to the solution equivalent to the acidity which will just change the color of Methyl Red, distilling formaldehyde from the reaction mixture until not to exceed 0.1% free formaldehyde remains therein, then converting water-soluble metallic salts in the remaining reaction mixture to water-insoluble metallic salts to precipitate the latter, and filtering out the insoluble metallic salts.

2. *In the process for the production of pentaerythritol by the interaction of formaldehyde and acetaldehyde in the presence of a strongly basic metallic hydroxide, the increasing of the ratio of pentaerythritol to poly-pentaerythritol in the reaction mass which comprises employing between five and ten moles formaldehyde and in excess of one-half mole of said hydroxide per mole of acetaldehyde in the reaction mixture, maintaining the alkaline reaction mixture at a temperature not exceeding 33° C. until the disappearance of the acetaldehyde and thereupon, still at a temperature not exceeding 33° C., removing the free alkalinity of the reaction mixture by addition of sufficient acid to impart an acidity to the solution equivalent to the acidity which will just change the color of methyl red, distilling formaldehyde from the reaction mixture until not to exceed 0.1% free formaldehyde remains*

*therein removing metallic salts from the reaction mixture, and thereafter recovering pentaerythritol from the reaction mixture.*

HARRY JACKSON.
G. G. JONES.

REFERENCES CITED

The following references are of record in the file of this patent or the original patent:

UNITED STATES PATENTS

| Number | Name | Date |
|---|---|---|
| 2,152,371 | Wyler | Mar. 28, 1939 |
| 2,240,734 | Wyler | May 6, 1941 |
| 2,292,926 | Brubaker et al. | Aug. 11, 1942 |
| 2,325,589 | Bried | Aug. 3, 1943 |
| 2,360,186 | Wyler | Oct. 10, 1944 |
| 2,369,083 | Spurlin | Feb. 6, 1945 |
| 2,372,602 | Owens | Mar. 27, 1945 |
| 2,401,749 | Burghardt | June 11, 1946 |